United States Patent [19]

Love et al.

[11] 4,360,454

[45] Nov. 23, 1982

[54] CATALYST FOR STEAM DEHYDROCYCLIZATION

[75] Inventors: Richard F. Love, Fishkill; Tansukhlal G. Dorawala; Edwin R. Kerr, both of Wappingers Falls, all of N.Y.

[73] Assignee: Texaco Inc., White Plains, N.Y.

[21] Appl. No.: 274,854

[22] Filed: Jun. 18, 1981

Related U.S. Application Data

[62] Division of Ser. No. 103,303, Dec. 13, 1979, Pat. No. 4,320,240.

[51] Int. Cl.³ .................. B01J 23/58; B01J 23/64; B01J 23/72; B01J 23/89
[52] U.S. Cl. .................. 252/465; 252/466 PT; 252/470; 252/474; 585/419
[58] Field of Search ............. 252/465, 466 PT, 470, 252/474; 585/419

[56] References Cited

U.S. PATENT DOCUMENTS

| | | | |
|---|---|---|---|
| 3,387,053 | 6/1968 | Lee ........................... | 252/470 |
| 3,901,827 | 8/1975 | Sinfelt et al. ................ | 252/474 |
| 3,962,140 | 6/1976 | Alcorn et al. ................ | 252/470 |
| 4,003,955 | 1/1977 | Hayes ........................ | 585/419 |
| 4,085,157 | 4/1978 | Juguin et al. ................ | 585/419 |
| 4,201,661 | 5/1980 | Juguin et al. ................ | 208/139 |
| 4,288,347 | 9/1981 | Rabinovich et al. ......... | 252/466 PT |

*Primary Examiner*—W. J. Shine
*Attorney, Agent, or Firm*—Carl G. Ries; Robert A. Kulason; Carl G. Seutter

[57] ABSTRACT

Steam dehydrocyclization of paraffinic hydrocarbons to aromatic hydrocarbons is effected in the presence of catalyst, typically a supported rhodium catalyst bearing copper.

8 Claims, No Drawings

CATALYST FOR STEAM DEHYDROCYCLIZATION

This is a division, of application Ser. No. 103,303, filed Dec. 13, 1979, now U.S. Pat. No. 4,320,240.

FIELD OF THE INVENTION

This invention relates to an improved method of steam dehydrocyclization of a dehydrocyclizable hydrocarbon to prepare aromatic hydrocarbons—and to a catalyst therefor.

BACKGROUND OF THE INVENTION

It has been found possible to effect steam dehydrocyclization of paraffinic hydrocarbons by use of supported catalysts which contain a Group VIII noble metal such as rhodium, commonly together with a Group VI B metal such as chromium. Operation with such catalysts is less than totally satisfactory because, while initially quite active and selective, these catalysts deactivate in the steam environment.

It is an object of this invention to provide a method of steam dehydrocyclizing a dehydrocyclizable hydrocarbon. It is another object of this invention to provide an improved catalyst for use in such a process. Other objects will be apparent to those skilled in the art.

STATEMENT OF THE INVENTION

In accordance with certain of its aspects, the process of this invention for steam dehydrocyclizing a dehydrocyclizable hydrocarbon may comprise contacting said dehydrocyclizable hydrocarbon at steam dehydrocyclization conditions with a reduced catalyst containing a porous support, a catalytic amount of a Group VIII metal, and an activating amount of a Group I B metal.

DESCRIPTION OF THE INVENTION

The charge dehydrocyclizable hydrocarbon which may be treated by the process of this invention may be any aliphatic hydrocarbon which is capable of undergoing aromatization, eg dehydrogenation typically with ring closure, to produce an aromatic hydrocarbon which may contain the same or a lesser number of carbon atoms. The charge hydrocarbons which are vaporizable at steam dehydrocyclization temperatures, are aliphatic hydrocarbons including paraffins (including naphthenes), olefins, or diolefins. When the charge is a paraffin, it may typically contain 6-20 carbon atoms. Illustrative of such paraffins may be hexane, cyclohexane, methylpentanes, heptanes, methylcyclohexane, octanes, methylheptanes, nonanes, decanes etc. Illustrative of the olefins may be hexenes, heptenes, octenes, nonene, etc. Illustrative of the diolefins may be hexadienes, heptadienes, octadienes, etc.

Commonly the charge dehydrocyclizable hydrocarbon may be one containing a mixture of the above paraffinic and optionally naphthenic components as available in a refinery stream. Illustrative of such streams may be those identified as- naphtha—typically a highly paraffinic straight run naphtha; a paraffinic raffinate from aromatic extraction; a $C_6$ to $C_{10}$ refinery stream; a naphtha fraction having a 140° F.–400° F. boiling range; etc.

Steam dehydrocyclization of the charge hydrocarbon is effected by passing the vaporized charge hydrocarbon together with steam through a catalyst bed at the following conditions:

TABLE

| Condition | Broad Range | Preferred Range | Typical |
|---|---|---|---|
| Temperature °F. | 700–1150 | 850–1000 | 1000 |
| Pressure psig | 10–300 | 50–100 | 70 |
| Steam/Hydrocarbon Mole ratio | 1:1–50:1 | 3:1–20:1 | 7:1 |
| WHSV | 0.1–10 | 0.5–2.0 | 1 |

The catalyst composition which may be employed in practice of the steam dehydrocyclization process of this invention may comprise a catalyst support and, distributed thereon and therein a catalytic amount of (i) a Group VIII metal, (ii) optionally a Group VI B metal, and (iii) optionally a Group I A metal; and (iv) an activating amount of a Group I B metal.

The Group VIII metal may include iron Fe, cobalt Co, and nickel Ni, or the noble Group VIII metals including ruthenium Ru, rhodium Rh, palladium Pd, osmium Os, iridium Ir, and platinum Pt. Preferably the Group VIII metal may be a noble metal; and in the most preferred embodiment, it is rhodium.

The Group VI B metal may be chromium Cr, molybdenum Mo, or tungsten W; and in the preferred embodiment, it is chromium Cr.

The Group I A metal, an alkali metal, may be lithium Li, sodium Na, potassium K, rubidium Rb or cesium Cs. In the preferred embodiment, it is potassium K.

The Group I B metal may be gold Au or preferably copper Cu or silver Ag. In a preferred embodiment, it is copper Cu.

The catalyst support may be active or inactive or inert. Typically the support may be a clay, a silica, a metal oxide, a zeolite, etc. The preferred porous material may include alumina, silica, silica-alumina, silica-magnesia, silica-titania, silica-beryllia, silica-zirconia, silica-alumina-magnesia, etc. The preferred support is an inert support such as alumina (preferably gamma alumina).

In typical practice of the process of this invention the catalyst composition may contain the following components in the parts by weight (expressed as oxide) indicated in the table.

In this table and in the others which follow, the matals are expressed as parts by weight of oxide. Thus, Group VIII—15 parts means that the composition contains Group VIII metal in amount sufficient to make 15 parts of the corresponding oxide eg NiO or $Fe_2O_3$. The support is expressed as parts by weight of eg alumina.

It will be clear that the metals will be present in the catalyst prior to reduction with hydrogen, typically not in the form of free metal, but as oxide or as other combined form. Active metals such as copper, nickel, or rhodium may be in the form of free reduced metal or as alloys after activation by hydrogen treatment. Other metals typified by chromium, potassium, and alumina will remain as the oxide as they are not reduced to the metal under conditions of operation.

TABLE

| Component | Broad | Preferred | Typical |
|---|---|---|---|
| Group VIII | 0.5–40 | 0.5–10 | 4 |
| Group VI B | 0–40 | 5–38 | 15 |
| Group I A | 0–5 | 1–4 | 2 |
| Support | 15–99.5 | 38–88.5 | 81 |
| Group I B | 0.2–1 | 0.4–0.8 | 0.5 |

One preferred catalyst may be that containing iron-rhodium-chromium-potassium-aluminum-copper; and the catalyst composition may contain the following (expressed as oxide):

TABLE

| Compound | Broad | Preferred | Typical |
|---|---|---|---|
| Fe | 2–40 | 3–10 | 6 |
| Rh | 0.2–2 | 0.5–1.5 | 1.0 |
| Cr | 0.01–40 | 5–30 | 17 |
| K | 0.01–5 | 1–4 | 2.4 |
| Al | 12–97.5 | 53–90 | 75 |
| Cu | 0.2–1.0 | 0.4–0.8 | 0.6 |

Another composition may contain nickel in place of iron.

In terms of molar proportions, the catalyst may be represented by the formula:

a $(VIII)_{2/n}$ O:b $(VI)_{2/m}$ O:c $(IA)_2$O:d (Supp):e $(IB)_{2/p}$O wherein (VIII) represents a metal of Group VIII of the Periodic Table having a valence n, (VI) represents a metal of Group VI B of the Periodic Table having a valence m, (IA) represents a metal of Group I A of the Periodic Table, (IB) represents a metal of Group I B of the Periodic Table of valence p and Supp represents the support. a may be 0.002–0.75, preferably 0.002–0.19, say 0.08; b may be 0.0001–0.78, preferably 0.10–0.60, say 0.33; c may be 0.0–0.17, preferably 0.003–0.13, say 0.02; d is 0.15–2.49, preferably 0.38–2.21, say 0.71 and e is 0.0025–0.013, preferably 0.003–0.01, say 0.0075.

In one preferred embodiment, the catalyst may be represented by the formula a $Rh_2O_3$:b $Cr_2O_3$:c $K_2O$:d (Supp): e CuO wherein a is 0.002–0.02, preferably 0.008–0.012, say 0.01; b is 0–0.78, preferably 0.03–0.25, say 0.15; c is 0–0.05 preferably 0.01–0.04, say 0.02, d is 0.15–2,49, preferably 0.38–2.21, say 0.76 and e is 0.002–0.02, preferably 0.003–0.015, say 0.0075.

When the support is alumina, as in one typical embodiment, the catalyst composition may be represented by the formula a NiO:b $Cr_{2/3}$O:c $K_2O$:d $Al_2O_3$:e CuO and d may preferably be 0.50–0.88, more preferably 0.66–0.81, say 0.71.

A preferred catalyst composition may have the following composition:

a (NiO+$Rh_2O_3$); b $Cr_{2/3}$O:c $K_2O$:d $Al_2O_3$:e CuO wherein the values of a, b, c, d, and e are as above and further characterized by the fact that rhodium Rh is present in amount of about 1%–20% by weight of the weight of the nickel.

In practice of this invention, the catalyst may be prepared by immersing a catalyst support in a solution containing the metal ions. The support, typically a gamma-alumina extrudate of 1.5 mm diameter and 10 mm length, may first be steam sintered at 900°–1400° F., say 1110° F. for 5–25 hours, say 12 hours. During sintering, there may be passed through the bed, air at VHSV of 40–600, say 230 together with steam at water VHSV of 0.05–0.10, say 0.06. The steamed alumina is then calcined for 1–5, say 2 hours at 900° F.–1200° F., say 1000° F. The initial surface of the alumina, typically 200–400, say 231 meter $^2$/gram may be decreased to 70–95%, say about 90% to a value of 140–380, say 192 meter $^2$/gram.

The support (242 parts), preferably as so treated, is cooled to ambient conditions and wetted with 200–2525 parts, say 890 parts of solution prepared by dissolving soluble decomposable salts of metals of Group VIII, VI B, and Group I A in aqueous solution. Preferably 5–1000 parts, more preferably 200–1000, say 792 parts of a salt of a Group VI B metal, typically chromium nitrate nonahydrate $Cr(NO_3)_3.9H_2O$ and 5–25 parts, preferably 10–23, say 17.2 parts of a salt of a Group I A metal, typically potassium nitrate and 50–700, say 267 parts of a salt of a Group VIII metal, typically Ni($NO_3)_2.6H_2O$ are dissolved in 60–2900 parts, say 343 parts of water to yield total solution in amount of 120–4625 parts, say 1419 parts. (although nitrates of the metals are preferably employed, acetates, formates, citrates, or other soluble, decomposable salts may be used). When the catalyst is to contain nickel, nickel formate is particularly preferred since the nickel formate decomposes directly to metallic nickel on heat treating in an inert atmosphere. Other salts of nickel, such as the nitrate, acetate, citrate, etc. decompose to give nickel oxide which can be reduced, wholly or in part, in a reducing atmosphere to metallic nickel at the temperatures and pressures used.

The solution is poured over the support and is stirred intermittently for 0.5–10 hours, say 1 hour and the solution (50–2400 parts, typically 731 parts) may then be decanted. The impregnated support is dried at 212°–400° F., say 300° F.

Further treatment includes heating for 0.5–24 hours, say 1 hour, at 650° F.–1000° F., say 700° F. in a flowing stream of nitrogen to decompose the decomposable salts, typically nitrates, and then calcining for 1–10 hours, say 2 hours at 600°–1000° F., say 700° F. to yield 260–1850 parts, say 462 parts having a density of 0.7–1.5, say 1.11.

The Group I B metal, preferably copper may be added to the catalyst system in manner comparable to that by which the other metals are added. It may be added before, with, or after the other metals. Typically it will be added as copper nitrate although other soluble decomposable salts may be employed. While the Group I B metal is designated in the formulae in the form of a particular oxide eg CuO, it may be present as a higher or lower valent oxide or as the free metal.

Preferably the Group I B metal may be added as an aqueous solution of silver nitrate, copper nitrate, copper acetate, etc. containing 5–50 parts, preferably 5–25 parts, say 15 parts of the metal salt.

The product catalyst so prepared may be characterized by the formula a $(VIII)_{2/n}$O:b $(VI)_{2/m}$O:c $(I)_2$O:d (Supp):e $(IB)_{2/p}$O wherein all the symbols are as noted supra.

Preferred catalyst compositions may have the formula 0.08 $Rh_2O_3$:0.59 $Cr_{2/3}$O:0.02 $K_2O$:0.52 $Al_2O_3$:0.0075 CuO 0.08 $Rh_2O_3$:0.3 $Cr_{2/3}$O:0.02 $K_2O$:0.68 $Al_2O_3$:0.004 CuO 0.01 $Rh_2O_3$:0.20 $Cr_{2/3}$O:0.02 $K_2O$:0.75 $Al_2O_3$:0.006 CuO 0.006 $Rh_2O_3$:0.10 $Cr_{2/3}$O:0.02 $Na_2O$:0.871 $SiO_2$:0.003 CuO 0.006 $Rh_2O_3$:0.2 NiO:0.10 $Cr_{2/3}$O:0.02 $K_2O$:0.8 $SiO_2$:0.003 Cu The more preferred compositions contain rhodium and nickel in addition to copper. Presence of rhodium in the catalyst generally is conducive to attainment of high yield of aromatic product in high selectivity. The inclusion of nickel with rhodium improves the durability of the rhodium catalyst although with a reduction in yield and selectivity. The inclusion of copper with rhodium in the catalyst system gives higher aromatic yield, higher aromatic selectivity, and longer catalyst life than is achieved by use of rhodium alone or nickel-rhodium.

The inclusion of both copper and nickel with rhodium also gives higher aromatic yield and higher aromatic selectivity and a catalyst life which is much longer than that attained with rhodium alone, copper-rhodium, or nickel-rhodium.

A preferred composition may contain 5% NiO, 1% $Fe_2O_3$, 8.9% $Cr_2O_3$, 1.8% $K_2O$, 0.75% $Rh_2O_3$, 0.49% CuO and balance (82%) $Al_2O_3$. Another preferred composition may contain 5% NiO, 15% $Cr_{2/3}O$, 2% $K_2O$, 0.9% $Rh_2O_3$, 0.5% CuO, and 76.6% $Al_2O_3$. The percentages in this paragraph are on a weight basis.

The catalyst composition used in practice of the process of this invention may be prepared by impregnating the support with solutions of metals of Groups VIII, VI B, I B, and I A. Typically for example it may be found that the catalyst may be prepared by:

a. impregnating the support sequentially with several solutions each containing one or more of the metals and thereafter drying and calcining;

b. impregnating the support with one or more solutions containing less than all of the metal (i.e. species or amount), drying and/or calcining, thereafter impregnating the support with the remaining metals, and drying and/or calcining etc.

In one embodiment, the catalyst support may thus be prepared by impregnating the support, typically alumina, with one solution containing soluble decomposable salts of the Group VI B and Group I A metals, typically chromium and potassium, drying and calcining, thereafter impregnating the so-obtained precatalyst with a solution of a soluble-decomposable salt of the Group VIII metal, typically nickel, and drying and calcining and thereafter impregnating with a solution of soluble decomposable salt of Group I B, typically copper, and drying and calcining.

In the preferred embodiment, the catalyst composition may be in the form of pellets, cylinders, or randomly shaped particles; a typical catalyst composition may be in the form of cylinders, of diameter 1-15 mm, say 1.5 mm and height 1-15 mm, say 8-10 mm.

It is a feature of this invention that improved results (particularly in terms of increased conversion and yield at desirably high selectivity) may be achieved by reducing the calcined supported catalyst for 4-16 hours, preferably 4-8 hours, say 6 hours in the presence of hydrogen. Reducing is effected at high temperature—i.e. a temperature at or above that at which the subsequent reaction is normally carried out. Although some improvement may be obtained by treating at a temperature of 600°-800° F., it is preferred that treating be carried out at a temperature above that. The preferred temperature at which treating is preferably carried out is 900°-1400° F., more preferably 1000°-1200° F., say 1000° F. Preferably hydrogen treating by the process of this invention may be carried out at temperatures which are at least as high as and preferably up to 200° F. higher than those of subsequent reaction.

Reduction of the calcined supported catalyst of this invention may preferably be carried out after the catalyst is in place in the reaction vessel. The vessel may be filled with catalyst composition to a bulk density of 50-80 pcf, say 70 pcf. In the treating operation, the catalyst composition is heated to 950° F.-1400° F., preferably 1000° F.-1250° F., say 1000° F. in the presence of a reducing gas containing at least about 30 mole % hydrogen. The gas will preferably be substantially free of active components (other than hydrogen) which are capable of reacting with any of the materials in the system. It is particularly desirable that the gas be free of oxidizing components including oxygen.

This gas may contain (in addition to hydrogen) inert gases such as helium, nitrogen, or more preferably light paraffins such as methane, ethane, propane, etc. Hydrogen may be present typically in amount of 30-100 mole %, preferably 80-100 mole %, say 100 mole %, i.e. the preferred embodiment may be that in which the gas consists essentially of hydrogen.

Preferably the catalyst composition may be maintained for 4-16 hours, typically 4-8 hours, say 6 hours in a stream of flowing hydrogen typically flowing at a space velocity VHSV (STP) greater than about 3, more preferably greater than 40, say 40-500, typically 95.

When treating is carried out at atmospheric pressure, as in the preferred embodiment, the partial pressure of hydrogen may be at least about 9 psia (400 mm Hg), preferably 12-15 psia, say 15 psia (760 mm Hg).

During reduction, the metals may be converted from the oxide form in which they are typically found after calcining to a lower valent form. In the case of nickel, copper, and rhodium for example, they may be reduced to metal. Nickel oxide may be partly or entirely reduced to nickel metal. In the case of chromium, iron, and potassium, they are typically found, after activation, to be still in the form of oxide. $Cr_2O_3$ may be partially reduced to CrO. It should be noted that the formulae $Cr_2O_3$, $Rh_2O_3$ etc. are equivalent to the formulae $Cr_{2/3}O$, $Rh_{2/3}O$ etc.

It is a feature of the novel catalyst of this invention that it may be employed in hydrocarbon conversion processes, typified by steam dehydrocyclization of hydrocarbons with the attainment of unexpected results. Among these may be noted an increase in conversion and yield at a high level of selectivity.

It is a particular feature of the catalyst of this invention that activation of the catalyst containing the Group VIII metal by the addition of an activating amount of a Group I B metal permits attainment of steam dehydrocyclized product at high yields, high conversions, and high selectivity; and it is particularly found that these decrease (over the course of many hours of operation) by a substantially lesser amount than is found when using prior art catalysts which have not been activated as with copper.

In the preferred embodiment, steam dehydrocyclization, at the conditions hereinabove set forth, permits attainment of aromatic product. The charge hydrocarbon is dehydrogenated and cyclized to form desired aromatic products, typically obtained in conversions of 50%-90%, in yield of 30%-51%, say 45% and in selectivity of 71%-76%, say 73%.

In the case of a typical n-heptane charge, the product (per 100 moles charge) may be

TABLE

| Component | Broad | Preferred | Typical |
|---|---|---|---|
| Unreacted n-heptane | 8-48 | 35-40 | 35 |
| Aromatics | 30-51 | 40-45 | 45 |
| Other | 0-65 | 5-20 | 10 |

DESCRIPTION OF THE PREFERRED EMBODIMENTS

Practice of the process of this invention will be apparent to those skilled in the art from the following illustrative embodiments wherein, as elsewhere in this description, all parts are parts by weight unless otherwise specifically stated. Examples bearing an asterisk are control examples falling outside the invention. Other examples fall within the scope of the invention.

EXAMPLE I*

A catalyst composite containing about 0.9% rhodium, 10% chromia, 2% potassium oxide and 1.0% $Fe_2O_3$ on 86.1% gamma alumina support was prepared as in Example I of USP 3,436,433. A previously calcined alumina was treated in contact with a mixture of 40 mole percent water and 60 mole percent air at a temperature of 600° C. for a period of 12 hours. The steam treated alumina (36.1 g) was then slurried in an aqueous solution of 5.6 grams of $CrO_3$ and 1.0 gram of $Fe(NO_3)_3.9H_2O$. The slurry was air dried for 30 minutes, steam-dried for one hour at 80° C./130 mm Hg, and oven-dried at 300° F. for 3 hours followed by 2 additional hours at 500° F. An aqueous solution of $KNO_3$ (1.8 grams) and $RhCl_3.3H_2O$ (0.96 gram) was utilized to impregnate the calcined particles which were thereafter dried and further calcined at 1000° F. for 2 hours.

In each example, except where otherwise indicated, the same procedure herein set out was employed. The catalyst was charged to a continuous flow micro-reactor for treating using n-heptane as a typical paraffinic feed stock. The micro-reactor, consisting of a 410 ASA series stainless steel tube, 280×6 mm, was loaded with 4 cc (about 3 grams) of the 14–20 mesh catalyst and after insertion into the unit was heated in a stream of hydrogen (50 ml/minute) while gradually raising the temperature 200° per hour to 1000° F. and maintaining that temperature with reduced hydrogen flow (25 ml/minute) for 16 hours. n-Heptane and water were pumped from 10 ml burettes attached to a 50 ml reservoirs, and by means of partial liquid recirculation, heptane and water flow rates of 3–6 ml/hour through the reactor could be maintained. Because the steam dehydrocyclization runs required the simultaneous admission of heptane and water, the microunit was configured to allow liquid water injection near the influent to the preheater which was maintained at 600° F. The preheated steam and n-heptane were charged downflow to the reactor at a ratio of 7 moles steam/mole hydrocarbon and a weight hourly space velocity (hydrocarbon) of about 0.9–1.7. Reactor temperature and pressure were 1000° F. and 70–74 psig, respectively.

Reactor start-up involved flushing the reactor with nitrogen, bringing the reactor to temperature and introducing the water (steam). When the temperature had stabilized, addition of heptane was begun. After a 30 minute slop period, reactor cuts were taken.

Reactor effluent was cooled using a brine-water (40° F.) condenser and the liquid products collected in an ice-water cooled trap and subsequently analysed by liquid-vapor chromatography. Gaseous products were periodically sampled and analyzed by mass spectrometry. Total gas evolution was determined by wet test meter.

The results for Control Example I* are set forth in the Table which follows the Examples. The material balance calculations for the microunit runs were made on an IBM 1800 Computer. The calculations determined heptane conversion, aromatic yields and selectivities on the conventional basis of total products (gas, heptane and water) recovered. The aromatic yields were manually corrected for total carbon balance.

As can be seen from the date in Table I, this control catalyst shows good initial activity (43.3% initial yield of aromatics, 71.3% selectivity) but this rapidly diminishes with catalyst use becoming less than 9% aromatics yield after 30 hours on stream. Selectivity is similarly degraded.

EXAMPLE II

Following a similar catalyst preparation procedure as in Example I, but with the inclusion of copper (added as 1 part of copper nitrate in 30 parts of total aqueous solution to 50 parts of catalyst at the same time that the rhodium was added), a catalyst was prepared having the formulation 0.75% $Rh_2O_3$-0.49% CuO-8.9% $Cr_2O_3$-1.8% $K_2O$-1% $Fe_2O_3$ and 87% gamma-$Al_2O_3$, the latter from steam sintered Aero-100 alumina. Using the same feedstock and conditions, this catalyst showed improved yields of aromatics (benzene and toluene) and a slower rate of deactivation. (Table I). Thus, while the control catalyst of Example I* had lost 50% of its initial activity (43.5% yield of aromatics diminishing to 21%) at 1000° F. in 9–10 hours and to 13% in 20 hours, the experimental catalyst containing 0.49% added copper still retained 50% of its initial activity (51% reduced to 28% after 20 hours on stream at 1000° F.).

EXAMPLE III*

Using the catalyst preparative technique described in Example I, a control catalyst having the nominal composition 15% $Cr_2O_3$, 5% NiO, 2% $K_2O$ and 0.9% $Rh_2O_3$ on 77.1% steam sintered Aero-100, gamma $Al_2O_3$ was prepared. In this instance the chromia, potassia and rhodium were added together and after calcining, the nickel was added in the form of nickel formate. The catalyst was subsequently dried but not calcined.

Again, as indicated in Table I, this particular catalyst showed lower initial yields (28.5%) and selectivities (45%) at similar conversions (63%) than the catalysts of either Examples I or II. However, its deactivation rate was considerably slower, with 21% yields (27.5% loss) and 18% yields of aromatics.

EXAMPLE IV

Using the catalyst preparative technique described in Example II, a catalyst having the composition 15% $Cr_2O_3$, 5% NiO, 2% $K_2O$, 0.5% CuO and 0.9% $Rh_2O_3$ and 76.6% steam sintered Aero-100 gamma $Al_2O_3$ was prepared. In this catalyst preparation, the chromia and potassia were added first, and after drying and calcining at 500° F., the rhodium (as $RhCl_3.1H_2O$) and copper (as copper nitrate) were added and the mixture again dried and calcined at 1000° F. Nickel, in the form of an aqueous solution of nickel formate, was added last and the resultant catalyst was then dried at 260° F. but not calcined.

This catalyst proved to be the most stable catalyst tested. As shown in the Table, while affording slightly lower initial yields of aromatics (42% yield, 71% selectivity) than the rhodium catalyst without either nickel or copper (Example I), this catalyst retained 85% of its original productivity (as measured by yield of total aromatics) after 20 hours and was reduced to 60% of its initial activity after 80 hours.

EXAMPLE V*

A similar formulation (to that of Example III) was prepared using steam sintered gamma-$Al_2O_3$ as a support. This catalyst, nominally contained 1.2% $Rh_2O_3$, 4.25% NiO (as nickel formate), 18% $Cr_2O_3$ and 2.5% $K_2O$ on 84% gamma alumina. As evidenced by the data in the Table, the activity (% conversion) of this catalyst was greater than the catalyst in Example III, but aromatics yields (20% initially with 27% selectivity) were lower. The rate of catalyst deactivation was lower (i.e. better) than that shown by the catalyst in Example I, which contained neither nickel nor copper.

EXAMPLE VII

Another catalyst prepared in manner comparable to that of Example II contains different proportions of chromia, copper and nickel (0.88% $Rh_2O_3$, 6.6% NiO, 0.5% CuO, 18% $Cr_2O_3$, 2.5% $K_2O$ on 73% gamma-$Al_2O_3$, the Ni included as nickel nitrate rather than formate, this catalyst evinced slower deactivation rate and better selectivities than the comparable catalyst without copper.

TABLE

Steam Dehydrocyclization of n-Heptane using Rh—Ni, Rh—Cu, and Rh—Ni—Cu Based Catalyst:Comparative Catalyst Life Studes

| Catalyst Composition (% Metals, Metal Oxides) | | Time on Stream (Hours) | | | | | | | |
|---|---|---|---|---|---|---|---|---|---|
| | | 1 | 5 | 10 | 20 | 30 | 40 | 50 | 60 |
| Example I* | % Conversion | 61 | 60 | 45 | 35 | 31 | — | — | — |
| 10 $Cr_2O_3$ | % yield | | | | | | | | |
| 2 $K_2O$ | toluene | 41.5 | 27.9 | 20 | 12.4 | 8.1 | — | — | — |
| 1 $Fe_2O_3$ | benzene | 2.0 | 1.1 | 1 | 0.6 | 0.4 | — | — | — |
| 0.7 $Rh_2O_3$ | total aromatics | 43.5 | 29 | 21 | 13 | 8.5 | — | — | — |
| 86.3 $Al_2O_3$ | % Selectivity (Aromatics) | 71.3 | 48.3 | 46.6 | 38 | 27.4 | | | |
| Example II | % Conversion | 67.5 | 65 | 72 | 62 | 62 | 45 | 38 | — |
| 9 $Cr_2O_3$ | % yields | | | | | | | | |
| 1.8 $k_2O$ | toluene | 46 | 40 | 33.5 | 24.5 | 18.8 | 14.3 | 10.4 | — |
| 1 $Fe_2O_3$ | benzene | 5.2 | 4.6 | 4.4 | 3.5 | 2.2 | 2.1 | 2.1 | — |
| 0.5 CuO | total aromatics | 51 | 45 | 38 | 28 | 21 | 16.5 | 12.5 | — |
| 0.75 $Rh_2O_3$ | % Selectivity (Aromatics) | 75.5 | 69.2 | 52.7 | 45 | 33.8 | 36.6 | 32.9 | |
| 86.95 $Al_2O_3$ | | | | | | | | | |
| Example III* | % Conversion | 63 | 62 | 60 | 63 | 60 | 70 | — | — |
| 15 $Cr_2O_3$ | % yields | | | | | | | | |
| 2 $K_2O$ | toluenes | 25.3 | 24.2 | 22.5 | 18.7 | 17.8 | 16.2 | — | — |
| 5 NiO | benzene | 3.2 | 2.8 | 2.5 | 2.3 | 2.2 | 1.8 | — | — |
| 8.9 $Rh_2O_3$ | total aromatics | 28.5 | 27 | 25 | 21 | 20 | ca 18 | — | — |
| 77.1 $Al_2O_3$ | % Selectivity (aromatics) | 45 | 43.5 | 41.6 | 33.3 | 33.3 | 25 | — | — |
| Example IV | % Conversion | 59 | 51 | 50 | 45 | 39 | 47 | 43 | 46 |
| 15 $Cr_2O_3$ | % yield | | | | | | | | |
| 2 $K_2O$ | toluene | 39 | 36.5 | 35 | 33.5 | 33 | 20 | 29 | 22 |
| 4.7 NiO | benzene | 2.5 | 2.5 | 2.3 | 2.2 | 2.3 | 2.7 | 2.4 | 2.3 |
| 0.86 CuO | total aromatics | 42 | 39 | 38 | 36 | 34 | 33 | 32 | 25 |
| 0.9 $Rh_2O_3$ | % Selectivity (aromatics) | 71 | 76.5 | 76 | 80 | 87 | 70 | 74.4 | 54 |
| 76.4 $Al_2O_3$ | | | | | | | | | |
| Example V* | % Conversion | 90 | 92 | 92 | 71 | 64 | 48 | 53 | — |
| 1.2 $Rh_2O_3$ | % yields | | | | | | | | |
| 4.25 NiO | toluene | 11.7 | 12.3 | 12.3 | 13 | 11.5 | 97 | 7.3 | — |
| 18 $Cr_2O_3$ | benzene | 8.3 | 6.2 | 5.2 | 3 | 2.5 | 2.3 | 2.2 | — |
| 2.5 $K_2O$ | total aromatic | 20 | 18.5 | 17.5 | 16 | 14 | 12 | 8.5 | — |
| 74 $Al_2O_3$ | % Selectivity (Aromatics) | 22 | 20 | 19 | 22.5 | 22 | 25 | 16 | — |
| Example VI | % Conversion | | | | | | | | |
| 0.93 Rh | % Yield | 52 | 50 | 47 | 42 | 45 | 49 | 48 | — |
| 18 $Cr_2O_3$ | toluene | 34.5 | 34 | 32 | 29 | 23 | 18.5 | 13.5 | — |
| 2.5 $K_2O$ | benzene | 4.9 | 3.0 | 2.5 | 2.6 | 4.1 | 2.9 | 2.5 | — |
| 0.46 CuO | total aromatics | 39.5 | 37 | 35 | 31 | 27 | 22 | 16 | — |
| 78.1 $Al_2O_3$ | % Selectivity (Aromatics) | 76 | 74 | 74.5 | 74 | 60 | 45 | 33 | — |
| Example VII | % Conversion | 93 | 75 | 68 | 60 | 56 | 52 | 47 | — |
| 0.88 Rh | % yields | | | | | | | | |
| 2.5 $K_2O$ | toluene | 16.5 | 19 | 21 | 22 | 20 | 18 | 16.5 | |
| 6.6 NiO | benzene | 14.5 | 11 | 8 | 5 | 5 | 4.8 | 4.2 | |
| 0.5 CuO | total aromatics | 31 | 30 | 29 | 27 | 25 | 23 | 21 | |
| 18 $Cr_2O_3$ | % Selectivity (Aromatics) | 33 | 40 | 42 | 45 | 44 | 44 | 44.5 | |
| 71.3 $Al_2O_3$ | | | | | | | | | |

EXAMPLE VI

Another catalyst, (0.93% $Rh_2O_3$, 18% $Cr_2O_3$, 2.5% $K_2O$, 0.46% CuO on steam sintered gamma-$Al_2O_3$) prepared in manner comparable to that of Example II, also illustrates the pronounced effect of copper when added to a rhodium containing formulation. In this instance, while initial aromatics yields and selectivities were somewhat lower, (39.5% yield, 76% selectivity), aromatics yields and selectivities had diminished by only 6% after 20 hours on stream and catalyst productivity was halved only after 50 hours on stream.

The alumina used in all examples as the support was 14–20 mesh Aero-100 gamma alumina which had been steam sintered and dried.

All examples were carried out in a continuous flow micro-reactor using ca. 3 grams (4 ml) of catalyst operating at 1000° F. with an average water:heptane mole ratio of 7.

Examples I*, II, III*, and IV operated at 70 psig and 0.9 WHSV.

Examples V*, VI, and VII operated at 72–74 psig and 1.7 WHSV.

From inspection of the above table, it is apparent that use of the typical catalyst of this invention containing rhodium-copper or rhodium-nickel-copper permits attainment of outstanding and unobvious results. Generally the presence of copper, typically in amount of only ca 0.5% permits the catalyst to retain eg 2.5 times as much activity as would be the case if copper were not present.

Example I* utilizes a control catalyst containing Fe-Rh-Cr-K-Al$_2$O$_3$ without Group IB metal. Example II, within the scope of this invention, utilizes a catalyst which is comparable to the catalyst of Example I except that the catalyst of Example II contains copper, a metal of Group I B. It will be noted that in control Example I*, the total aromatics yield is 43% at one hour and this drops steadily to 8.5% after 30 hours. In contrast the total aromatics yield of Example II starts at 51% (almost 25% higher than the corresponding number of Example I) at one hour. After 30 hours, it is 28% in Example II—over twice that of Example I. In fact the total aromatic yield after 50 hours in Example II is 12.5% which is 50% higher than that of Example I after only 30 hours on stream.

The Selectivity of the Example II catalyst to aromatics is initially higher and, as can be seen, it has a life which is about twice that of Example I. At 20 hours, the catalyst of Example I has decreased Selectivity to 38% while in Example II, Selectivity is 36.6% after 40 hours. Comparable conclusions may be drawn from comparison of other Examples. Example IV is particularly outstanding with respect to total aromatic yield and selectivity.

Results comparable to those obtained in Example II may be obtained when the catalyst is:

| Example | Catalyst |
|---|---|
| VIII | 0.9% rhodium |
| | 0.5% copper |
| | 98.6% silica |
| IX | 0.9% rhodium |
| | 2.0% potassium |
| | 0.4% silver |
| | 96.7% gamma alumina |
| X | 3.0 nickel |
| | 0.8% rhodium |
| | 10% chromium |
| | 15% potassium |
| | 0.4% copper |
| | 70.8% gamma alumina |
| XI | 6% cobalt |
| | 8% tungsten |
| | 0.5% copper |
| | 0.9% rhodium |
| | 84% silica-alumina |

Results comparable to those obtained in Example II may be obtained when the charge hydrocarbon which is to be steam dehydrocyclicized is:

| Example | Charge Hydrocarbon |
|---|---|
| XII | n-octane |
| XIII | n-nonane |
| XIV | n-hexane |
| XV | cyclohexane |
| XV | straight-run paraffinic naphtha having a 10% bp 160° F. 50% bp 265° F. 90% bp 370° F. |

Although this invention has been illustrated by reference to specific embodiments, it will be apparent to those skilled in the art that various changes and modifications may be made which clearly fall within the scope of this invention.

We claim:

1. A catalyst composition consisting essentially of a porous support, a catalytic amount of a Group VIII metal, a Group IA metal, and an activating amount of a Group IB metal.

2. A catalyst composition as claimed in claim 1 wherein said catalyst contains a Group VIII noble metal.

3. A catalyst composition as claimed in claim 1 wherein said catalyst contains rhodium.

4. A catalyst composition as claimed in claim 1 wherein said catalyst contains rhodium and copper.

5. A catalyst composition comprising
a (VIII)$_{2/n}$O: b (VI)$_{2/m}$O: c (IA)$_2$O: d (Supp): e (IB)$_{2/p}$O wherein VIII represents a metal of Group VIII of the Periodic Table of valence n, VI represents metal of Group VI B of the Periodic Table of valence m, IA represents a metal of Group I A of the Periodic Table, Supp represents support, IB represents a metal of Group I B of the Periodic Table of valence p, a is 0.002–0.75, b is 0.0001–0.78, c is 0.003–0.13, d is 0.15–2.49, e is 0.0025–0.13.

6. A catalyst composition consisting essentially of (0.002–0.02) Rh$_{2/3}$O: (0–0.78) Cr$_{2/3}$O: (0.01–0.04) K$_2$O; (0.003–0.01) CuO:Al$_2$O$_3$.

7. A catalyst composition consisting essentially of a supported catalyst containing rhodium, potassium and copper.

8. A catalyst composition comprising a supported catalyst containing rhodium, nickel, potassium, and copper.

* * * * *